Nov. 26, 1957  A. H. BOERDIJK  2,814,746
ELECTRIC MOTOR
Filed Aug. 12, 1954
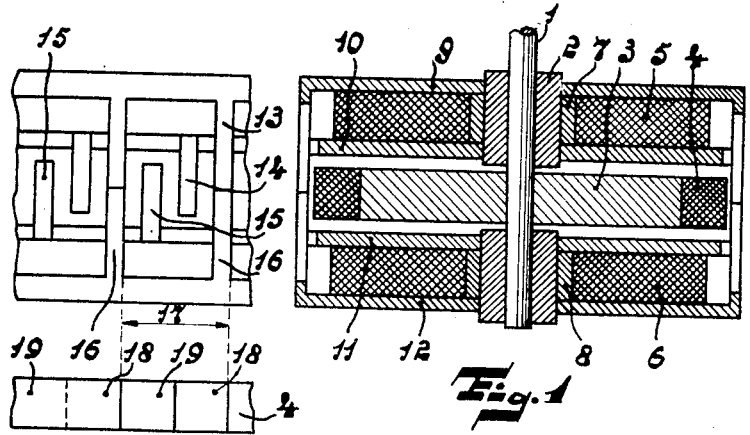
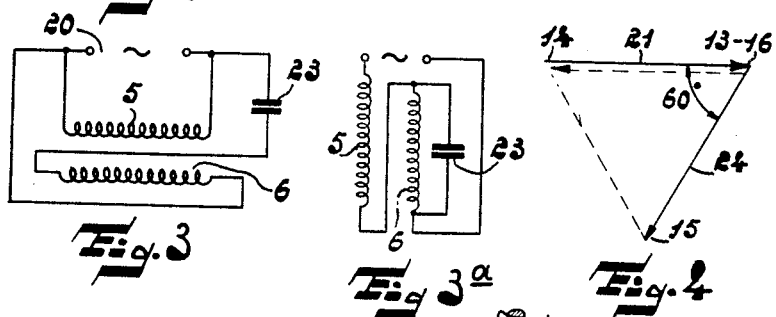
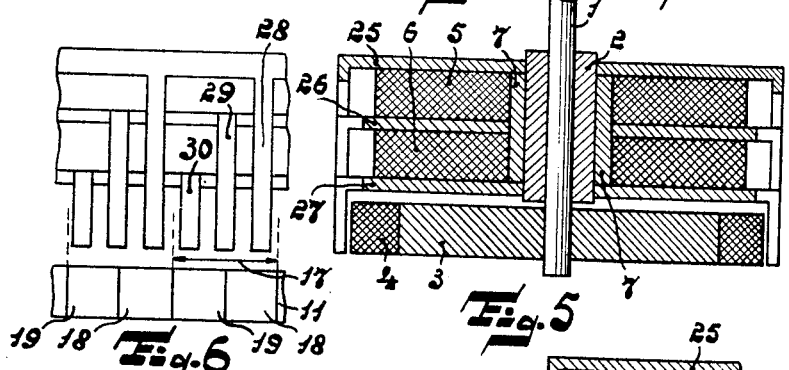
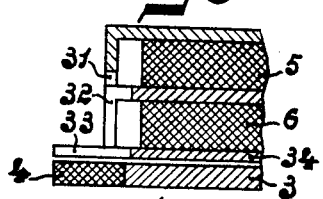
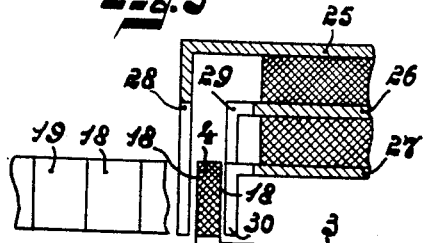
INVENTOR
ARIE HENDRIK BOERDIJK
BY Fred M. Vogel
AGENT United States Patent Office 2,814,746
Patented Nov. 26, 1957

2,814,746

ELECTRIC MOTOR

Arie Hendrik Boerdijk, Eindhoven, Netherlands, assignor, by mesne assignments, to North American Philips Company, Inc., New York, N. Y., a corporation of Delaware Application August 12, 1954, Serial No. 449,316

Claims priority, application Netherlands September 11, 1953

5 Claims. (Cl. 310—164)

This invention relates to magnetic circuits, more particularly stators, for electric machines, more particularly self-starting synchronous motors, and exhibits the characteristic that the circuit comprises two coils arranged co-axially and each comprising toothed pole plates of ferromagnetic material, the numbers of teeth of the pole plates being equal at least approximately and the teeth being provided in the form of a circle in such a manner that each pitch of a pole comprises three teeth. The term "pitch of a pole" is to be understood in this case to mean the spacing between the beginning of a tooth of a pole plate and the beginning of the next following tooth of the same pole plate.

This construction affords the advantage that each pole piece comprises only three teeth (instead of four teeth as in known constructions) so that the number of pole pitches may be larger.

It will be evident that, when use is made of a large number of teeth, there is no objection to omit a tooth here and there, since this is not harmful for the machine to any appreciable extent. In an electric motor of this type the couple will thus be reduced only slightly. From the foregoing it follows that the pole plates need not necessarily have exactly the same number of teeth.

Such a simple construction comprising only two coils still permits of obtaining a rotating field which is substantially exactly circular in shape by connecting the coils to alternating voltages relatively shifted in phase by 120°, for example to two phases of a three-phase mains.

In a simple embodiment of the machine according to the invention, one toothed pole plate is arranged as a common pole plate between the two coils.

In order that the invention may be readily carried into effect, it will now be described with reference to the accompanying drawing showing diagrammatically, by way of example, some embodiments thereof.

Fig. 1 is a cross-sectional view of the device embodying the present invention,

Fig. 2 is a side elevational view thereof,

Figs. 3, 3a show schematically the alternate arrangements of the coils and capacitor, Fig. 4 shows a vector diagram of the arrangements of Figs. 3 and 3a, Fig. 5 is a cross-sectional view of a modification of the device embodying the present invention, Fig. 6 is a side elevational view thereof, Figs. 7 and 8 are partial cross-sectional views of alternative embodiments of the present invention.

A shaft 1, which is supported in bearings 2, carries a rotor 3 having a circular body 4 of permanent magnetic material. The material thereof is similar, for example, to the material as described in the U. S. patent application Ser. No. 325,202, filed December 10, 1952. The circumference of the body 4 comprises a large number of N and Z-poles. On each side of the rotor 3, coils 5 and 6 are arranged coaxially on cores 7 and 8 of ferromagnetic material, for example soft iron. The coils 5 and 6 are surrounded by toothed pole plates 9, 10 and 11, 12.

Fig. 2 shows the teeth more clearly. The pole plates 9, 10, 11, 12 comprise teeth 13, 14, 15, 16 respectively. The numbers of teeth of the various pole plates are equal. Furthermore the teeth are provided in such manner that one pitch 17 of a pole comprises three teeth, which is achieved by combining, for example, the teeth 13 and 16 into one tooth. In Fig. 2, the ring 4 of permanent magnetic material is shown outside the stator for the sake of clearness. The rotor comprises an N-pole 18 and a Z-pole 19 per pitch of a pole.

The coils 5 and 6 are connected in opposite directions to an alternating voltage source 20 as shown in Fig. 3, so that vectors 21 and 22 which indicate either the voltages set up at the coils or the currents traversing the coils and hence the magnetic potential differences between the fluxes, are oppositely directed as shown in Fig. 4. By providing a capacitor 23 in series with, for example, the coil 6, the vector 22 may be shifted in phase by about 60° to the position 24, resulting in a symmetric rotating field, since the magnetic fluxes originating from the teeth 13, 14, 15 relatively differ in phase by 120°. The third phase, which is shown in dotted line, is automatically created between the teeth 15 and 14. The phase shift is thus considerably smaller than in the constructions of known type in which a phase shift of 90° is aimed at, so that the capacitor 23 may be smaller.

The self-starting synchronous motor described hereinbefore may be reversed in the direction of rotation by switching the capacitor 23 in series with the coil 5. If the direction of rotation of the motor need not be reversible, the required phase shift of 90°, instead of being obtained by means of a capacitor, may be brought about in known manner by the use of short-circuit windings round the teeth.

As an alternative, the circuit may be of the kind shown in Fig. 3a with the coils 5 and 6 oppositely connected in series and the capacitor 23 connected in parallel with the coil 6.

Furthermore, use may be made of other known rotors instead of a permanent magnetic rotor.

Figs. 5 and 6 show another embodiment comprising only three pole plates 25, 26, 27, since the pole plate 26 serves as a common plate for the two coils 5 and 6. The teeth are indicated by 28, 29 and 30 (Fig. 6). The rotor 4, as before, is shown outside the stator in Fig. 6 for the sake of clearness.

Fig. 8 shows a variant of Fig. 5 in which the pole plate 25 has a larger diameter, so that the teeth 28 concentrically surround the teeth 29 and 30 in a cylindrical plane. Instead of the teeth 28, other teeth may alternatively be located on a concentric cylindrical surface.

At last, Fig. 7 shows a variant in which teeth 31, 32 are bent at right angles in the flat plane of teeth 33 of a pole plate 34.

The construction described may also serve as generators.

What is claimed is:

1. A stator in a self-starting synchronous motor comprising a magnetic circuit including at least two coils positioned co-axially, each of said coils being provided with toothed pole plates of ferromagnetic material, the number of teeth of each pole plate being approximately equal and the pitch of each pole having three teeth arranged in the form of a circle, one toothed pole plate being arranged as a common pole plate between said two coils, and the teeth of all pole plates being located on the same plane.

2. A stator as set forth in claim 1 further comprising an alternating voltage source connecting said coils to produce oppositely directed magnetic fluxes in the magnetic circuit, and a phase-shifting means acting upon said fluxes to produce a substantially symmetrical three-phase rotational field.

3. A stator as set forth in claim 2 wherein said phase-shifting means is a capacitor associated with said coils for bringing about a phase shift of approximately 60° between the currents in said coils.

4. A self-starting synchronous motor comprising a stator including a magnetic circuit, at least two coils positioned co-axially, each of said coils being provided with toothed pole plates of ferromagnetic material, and the pitch of each pole having three teeth arranged in the form of a circle, a rotor having permanent magnetic poles of alternate polarities at its circumference, the number of N and S poles being equal to the number of teeth of a pole plate, said coils being positioned on opposite sides of said rotor.

5. A stator as set forth in claim 3 wherein the capacitor can be changed from being in series with one of said coils to being in parallel therewith, and vice versa.

References Cited in the file of this patent

UNITED STATES PATENTS

| | | |
|---|---|---|
| 630,333 | Dietrich | Aug. 8, 1899 |
| 2,070,447 | Morrill | Feb. 8, 1937 |
| 2,292,265 | Carpenter | Aug. 4, 1942 |
| 2,443,104 | Glass | June 8, 1948 |
| 2,539,144 | Kuhlmann | Jan. 23, 1951 |
| 2,566,238 | Midgley | Aug. 28, 1951 |